US009266515B2

(12) United States Patent
Pfefferl et al.

(10) Patent No.: US 9,266,515 B2
(45) Date of Patent: Feb. 23, 2016

(54) AIR DRYER PURGE CONTROLLER AND METHOD

(71) Applicant: Bendix Commercial Vehicle Systems LLC, Elryia, OH (US)

(72) Inventors: David J Pfefferl, Broadview Heights, OH (US); Leonard A Quinn, Lagrange, OH (US); Andras Sipos, Sheffield Village, OH (US); Aaron S Wilfing, Vermillion, OH (US); Cory J Hamilton, Spencer, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 143 days.

(21) Appl. No.: 14/197,916

(22) Filed: Mar. 5, 2014

(65) Prior Publication Data

US 2015/0251645 A1    Sep. 10, 2015

(51) Int. Cl.
| | |
|---|---|
| *B01D 53/26* | (2006.01) |
| *B60T 17/00* | (2006.01) |
| *B01D 53/04* | (2006.01) |

(52) U.S. Cl.
CPC ........... *B60T 17/004* (2013.01); *B01D 53/0454* (2013.01); *B01D 53/261* (2013.01)

(58) Field of Classification Search
CPC .. B01D 53/04; B01D 53/0454; B01D 53/261; B01D 2259/40043; B01D 2259/40086; B01D 2259/4566; B60T 17/004
USPC .......... 95/19, 21, 117, 121, 122, 148; 96/109, 96/113, 114, 115; 34/80, 472, 473
See application file for complete search history.

(56) References Cited

U.S. PATENT DOCUMENTS

| | | | |
|---|---|---|---|
| 4,763,959 A | 8/1988 | Vandemotter | |
| 4,936,026 A | 6/1990 | Cramer et al. | |
| 5,027,529 A | 7/1991 | Cramer et al. | |
| 5,103,576 A * | 4/1992 | Cramer et al. | 34/549 |
| 5,145,495 A | 9/1992 | Elamin | |
| 5,257,008 A | 10/1993 | Elamin | |
| 5,369,959 A | 12/1994 | Pfefferle et al. | |
| 5,378,266 A | 1/1995 | Elamin | |
| 5,458,677 A | 10/1995 | Vandermolen | |

(Continued)

FOREIGN PATENT DOCUMENTS

DE    102008053996 A1 *  6/2010

OTHER PUBLICATIONS

Bendix Commercial Vehicle Systems LLC, SD-08-2418 "Bendix AD-IS and AD-IS Puraguard (Oil Coalescing) Air Dryer", service data sheet, Jul. 2011, 14 pages, Bendix Commercial Vehicle Systems Llc, Elyria, Ohio, USA.

(Continued)

*Primary Examiner* — Frank Lawrence
(74) *Attorney, Agent, or Firm* — Cheryl L. Greenly; Brian E. Kondas; Eugene E. Clair

(57) ABSTRACT

A method and controller for controlling the purge cycling of an air dryer assembly is disclosed. The controller includes a control output for transmitting a control signal for controlling the air dryer. The controller is capable of initiating an enhanced purge cycle for the air dryer based on a regeneration volume value. The regeneration volume value is based on the accumulated volume of air delivered to the air dryer for a first time or since a prior standard purge cycle.

32 Claims, 4 Drawing Sheets

(56) References Cited

U.S. PATENT DOCUMENTS

| | | |
|---|---|---|
| 5,575,541 A | 11/1996 | Elamin |
| 5,592,754 A | 1/1997 | Krieder et al. |
| 5,647,891 A | 7/1997 | Blizzard et al. |
| 5,926,969 A | 7/1999 | Crawford et al. |
| 6,050,651 A | 4/2000 | Thomas |
| 6,571,489 B2* | 6/2003 | Larsson et al. ................ 34/330 |
| 6,640,463 B1 | 11/2003 | Beck et al. |
| 6,858,066 B2 | 2/2005 | Quinn |
| 6,932,856 B2* | 8/2005 | Rake ................................ 95/10 |
| 7,103,991 B2 | 9/2006 | Moulding |
| 7,121,016 B2 | 10/2006 | Burn et al. |
| 7,179,320 B2 | 2/2007 | Iies et al. |
| 7,400,952 B2 | 7/2008 | Pervaiz |
| 7,608,132 B2* | 10/2009 | Fornof et al. ................... 95/23 |
| 7,771,508 B2* | 8/2010 | Hilberer ........................... 95/10 |
| 8,147,594 B2 | 4/2012 | Wright |
| 8,467,950 B1 | 6/2013 | Pfefferl et al. |
| 2002/0189456 A1* | 12/2002 | Hoffman et al. ................ 96/110 |
| 2008/0292471 A1 | 11/2008 | Sweet |
| 2012/0031273 A1* | 2/2012 | Heer ................................ 96/116 |
| 2013/0192464 A1 | 8/2013 | Asmis |

OTHER PUBLICATIONS

International Searching Authority Officer Blaine R. Copenheaver, "Notification of transmittal of the International Search Report and the Written Opinion of the International Searching Authority", May 20, 2015, 14 pages, ISA/US, United States.

\* cited by examiner

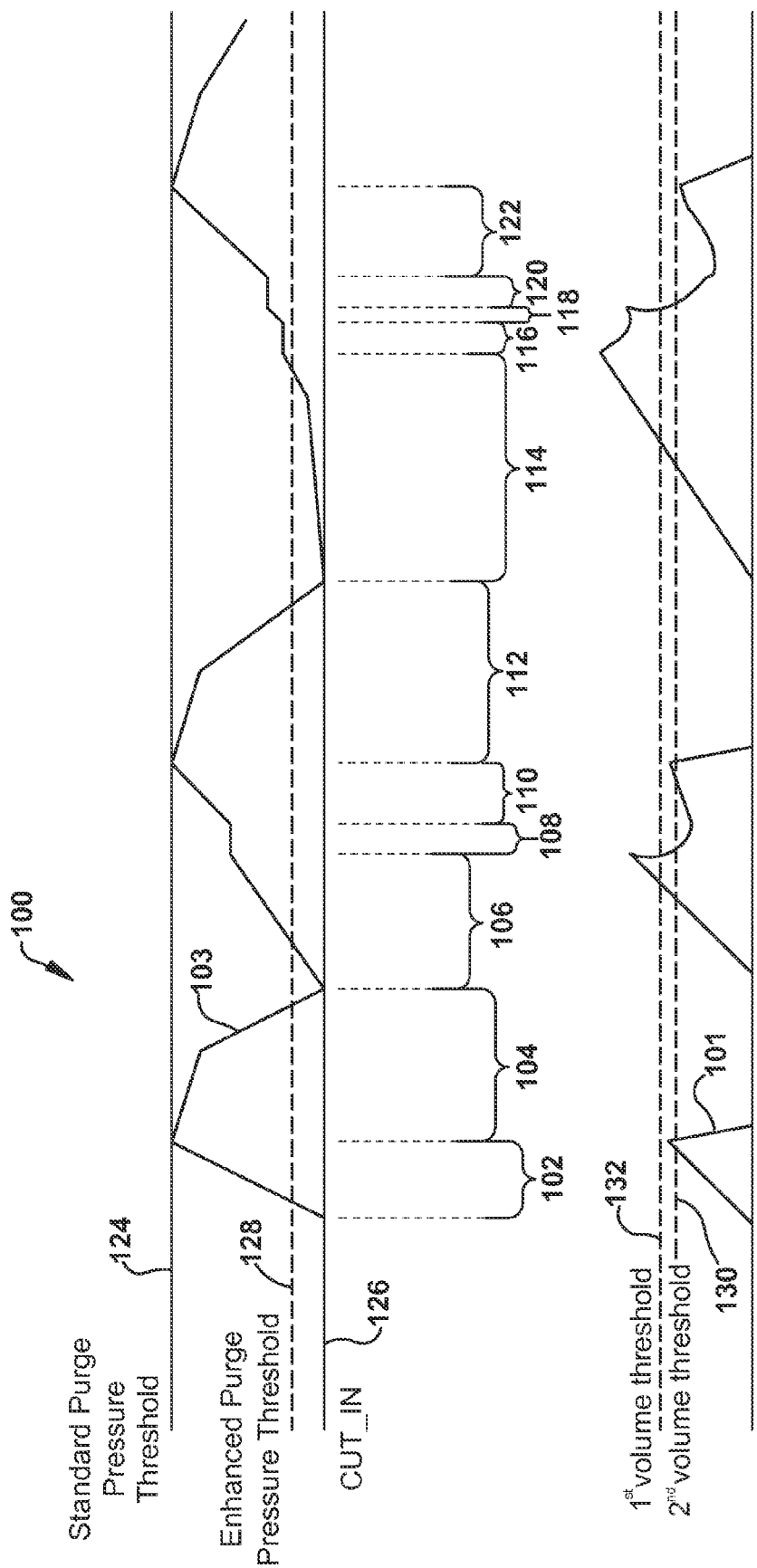

AIR DRYER PURGE CONTROLLER AND METHOD

BACKGROUND

The present invention relates to an air dryer assembly for use in a compressed air system for heavy vehicles, locomotives and/or auxiliary devices that use compressed air. Typical heavy vehicle compressed air systems include a compressor for compressing the air, an air dryer assembly for removing moisture and contaminants from the compressed air, a reservoir for storing the compressed air and valves and other pneumatic system components for distributing the compressed air. The present invention finds particular application in conjunction with heavy vehicles that use compressed air to selectively control application of vehicle brakes and will be described with particular reference thereto.

The compressor provides compressed air to a reservoir, the compressed air being used to operate vehicle brakes and other air operated systems associated with the vehicle. Ambient air is typically drawn into a compressor inlet for compression during an air delivery, or charging, cycle. The air brake compressor is typically supplied with oil in order to lubricate bearings and other components of the compressor.

Typically, the air dryer assembly is installed downstream from the compressor for reducing the moisture content of the compressed air. The air dryer assembly delivers substantially dry compressed air to a reservoir for use by braking system components, thereby increasing the service life of braking system components such as valves and pneumatic brake actuators. Providing clean dry compressed air to brake system components reduces maintenance costs. In some air dryers, a desiccant is used to adsorb water vapor as the compressed air passes through the air dryer assembly during a charging cycle. Liquid water and water vapor is adsorbed onto the desiccant. After a period of charging during normal operation, the desiccant becomes entrained with water and requires regeneration (i.e. removal of the water). The desiccant is regenerated through a purge cycle, which comprises passing pressurized air in a reverse direction through the desiccant.

In some air dryer systems, a purge cycle is initiated in response to the reservoir reaching a predetermined pressure and the compressor being in an unloaded state, or not delivering air. The purge cycle continues until all of the air in a purge reservoir is exhausted through the air dryer desiccant. Generally fir a given air vehicle dryer system the purge cycle is the same duration no matter how long the system may have been charging or how entrained with water, or moist, the air dryer desiccant may have been. That is, the duration is the time it takes to empty the purge reservoir. A subsequent purge cycle only occurs after the compressor returns to a delivery cycle, then unloaded again when the reservoir reaches the predetermined pressure. The typical air dryer using a standard purge may not be able to remove all of the moisture in the dryer desiccant, thereby deleteriously passing moisture downstream. The moist air will enter the purge reservoir, so moisture accumulates and subsequent purges would be less effective since moist air is used in the purge.

For the foregoing reasons, there is a need for a new and improved apparatus and methods which address the above-referenced problems.

SUMMARY

In one aspect of the present invention, it is contemplated that a controller for an air dryer includes a control output for transmitting a control signal and control logic capable of initiating an enhanced purge cycle. The control logic determines a regeneration volume value based on an accumulated volume of air delivered to the air dryer. The control logic transmits a control signal to the control output for initiating the enhanced purge cycle when the regeneration volume value exceeds a first predetermined volume threshold.

In another embodiment, the controller includes a pressure input for receiving a pressure signal indicative of the pressure of compressed air in a service reservoir. The control logic transmits the control signal when the pressure signal is greater than an enhanced purge pressure threshold and less than a standard purge pressure threshold and the regeneration volume value exceeds the first predetermined volume threshold.

In another aspect of the present invention, a method for controlling an air dryer includes receiving a signal indicative of a pressure in a service reservoir, determining a regeneration volume value, and transmitting a control signal to initiate an enhanced purge cycle in response to the pressure in the service reservoir being greater than an enhanced purge pressure threshold and the regeneration volume value being greater than a first predetermined volume threshold.

BRIEF DESCRIPTION OF THE DRAWINGS

The foregoing and other features and advantages of the present invention will become apparent to those skilled in the art to which the present invention relates upon consideration of the following detailed description of embodiments that apply principles of the present invention with reference to the accompanying drawings, wherein:

FIG. 4 illustrates various graphs of air pressure in a service reservoir over time and a regeneration volume value over time, according to an embodiment of the present invention.

DETAILED DESCRIPTION

Figure 1:
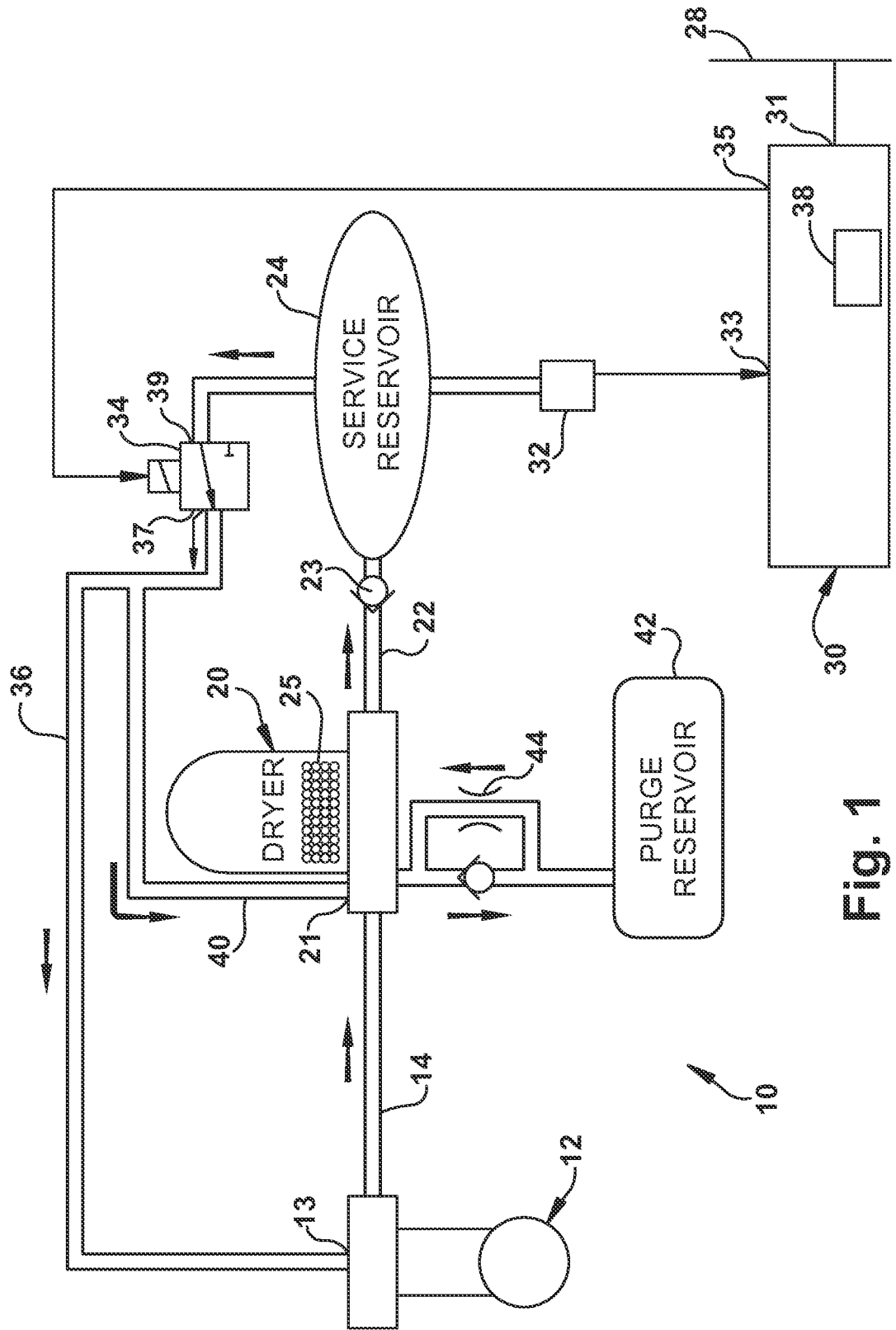
FIG. 1 illustrates a schematic representation of a vehicle air charging system and air dryer controller illustrating features of the present invention.

With reference to FIG. 1, an air charging system 10 for a vehicle according to one embodiment of the present invention is shown. The air charging system 10 includes a compressor 12 for compressing ambient air. The compressor 12 includes a control input 13 for receiving a pneumatic signal. The presence of a pneumatic signal at control input 13 changes the compressor 12 to an unloaded state, where the compressor 12 is not compressing air. The output of the compressor 12 is in fluid communication with an air dryer 20 via line 14.

The air dryer 20 receives the compressed air from the compressor 12 via line 14 when the compressor 12 is in a charging, or loaded, state. The air dryer 20 is operative to remove moisture from the compressed air, for example, by use of a desiccant 25, and to remove contaminants, such as oil, from the compressed air by use of a filter (not shown). The air dryer 20 includes a control input 21 for receiving a pneumatic signal. The presence of a pneumatic signal at the control input 21 initiates a purge cycle in the air dryer 20. The air dryer 20 is in fluid communication with at least one service reservoir 24 via line 22 for supplying air to braking system components (not shown). A check valve 23 prevents reverse flow from the service reservoir 24 to the air dryer 20.

The air dryer 20 communicates pneumatically with a purge reservoir 42. In one embodiment, the air dryer 20 is in fluid communication with the purge reservoir 42 via a valve 44. The air flows into the purge reservoir 42 via a check valve portion of the valve 44 and returns to the air dryer during the purge cycle via an orifice valve portion of valve 44. Alternatively, a pressure protection valve could be inserted between the purge reservoir 42 and air dryer 20. The purge reservoir 42 may be integral to the air dryer 20 or located remotely from the air dryer 20. The purge reservoir 42 preferentially receives clean dry air from the air dryer 20, thereby receiving the first dried air. Alternatively, the purge reservoir 42 may receive the compressed air at the same time as the at least one service reservoir 24.

The purge cycle initiated in the air dryer 20 can be a standard purge cycle, wherein the air from the purge reservoir 42 continues through the air dryer 20 until the air volume of the purge reservoir 42 is depleted. Alternatively, the purge cycle initiated in the air dryer 20 can be an enhanced purge cycle. An enhanced purge cycle is typically initiated in between standard purge cycles. During an enhanced purge cycle, a portion of the air volume of the purge reservoir 42 is depleted.

The air charging system 10 includes a controller 30 for controlling the air dryer 20. The controller 30 may also control the compressor 12, in one embodiment, the controller 30 includes a pressure input 33 for receiving a pressure signal indicative of the pressure of compressed air in the service reservoir 24. The signal may be from a pressure sensor 32 in pneumatic communication with the service reservoir 24. The pressure sensor 32 may be connected directly to the service reservoir 24 or may be located remotely from the service reservoir 24. The controller 30 may be connected directly or indirectly to the pressure sensor 32.

In another embodiment, the controller 30 includes a bus port 31 for communicating with a serial communications bus 28. In one embodiment, the controller 30 receives information or data via a received from bus port 31 via the serial communications bus 28. For example, a signal may indicate the pressure of compressed air in the service reservoir 24. The controller 30 may also receive a signal indicative of an engine speed, a compressor rating or the volume of the purge reservoir 42. In addition, an accumulated volume of air, which is a volume of compressed air delivered to the air dryer 20 since the installation of the controller 30 or since a prior standard purge cycle, or other information relative to the operation of the air charging system 10 may be transmitted via the serial communications bus 28.

The controller 30 includes control logic 38. The control logic 38 is capable of determining the accumulated volume of air if the accumulated volume of air is not received via the serial communications bus 28. The control logic 38 may include a timer. The control logic 38 calculates the accumulated volume based on the time the compressor 12 is in the loaded state for the first time or since a prior standard purge cycle, the engine speed, the compressor rating and other information. The accumulated volume is set at zero when the controller 30 is first installed on a vehicle and after each standard purge cycle. The accumulated volume is not set to zero after each enhanced purge cycle. Alternatively, the control logic 38 may receive the accumulated volume of compressed air delivered to the air dryer 20 via the serial communications bus 28 or other means. The control logic 28 is also capable of determining a regeneration volume value. The regeneration volume value is a percentage of the accumulated volume, details of which will be further described below.

The control logic 38 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 38. Known values such as the compressor rating and size of the purge reservoir 42 may be stored in the memory of the control logic 38.

The controller 30 includes a control output 35 for transmitting a control signal to an electropneumatic device 34. Alternatively, the controller 30 may transmit a control signal via port 31 to the serial communications bus 28.

The electropneumatic device 34 may be, for example, a solenoid or a switch. The pneumatic output 37 of the electropneumatic device 34 is pneumatically connected to the control input 13 of the compressor 12 via line 36 and to the control input 21 of the air dryer 20 via line 40. The electropneumatic device 34 communicates pneumatically with service reservoir 24 via a pneumatic input 39.

The controller 30 is capable of setting the compressor 12 in a loaded state, when it is delivering air to the air dryer 20, or unloaded state, when it is no longer delivering air to the air dryer 20. The controller 30 is capable of transmitting a signal to the electropneumatic device 34 via the control output 35 to activate the electropneumatic device 34. In one embodiment, activating the electropneumatic device 34 allows pneumatic communication from the service reservoir 24 to the line 36 to initiate an unloaded state of compressor 12. When the compressor 12 receives the pneumatic control signal at the control input 13 from the electropneumatic device 34, the compressor 12 is in the unloaded state. In the unloaded state, the compressor 12 is no longer delivering air to the air dryer 20 via line 14. The compressor 12 is typically set in the unloaded state when the pressure in the service reservoir 24 is greater than a cut out pressure. In one example, the cut out pressure ranges from about 105 psi to about 125 psi. In another example, the cut out pressure ranges from about 120 psi to about 140 psi. The compressor 12 is typically set in the loaded state when the pressure in the service reservoir 24 is less than or equal to a cut in pressure. In one example, the cut in pressure ranges from about 90 psi to about 105 psi. In another example, the cut in pressure ranges from about 100 psi to about 115 psi.

The control logic 38 is capable of initiating a standard purge cycle or an enhanced purge cycle of the air dryer 20. The control logic 38 is capable of transmitting the control signal to the electropneumatic device 34 via the control output 35 to activate the electropneumatic device 34 to initiate the standard purge cycle or the enhanced purge cycle of the air dryer 20. In one embodiment, activating the electropneumatic device 34 allows pneumatic communication from the service reservoir 24 to the line 40 to the control input 21 of the air dryer 20. When the air dryer 20 receives the pneumatic control signal, the standard purge cycle or the enhanced purge cycle begins. The pneumatic signal from the output 37 of the electropneumatic device 34 may go to both the compressor control input 13 and the air dryer control input 21 simultaneously so that the standard purge cycle or the enhanced purge cycle would be initiated at the same time the compressor 12 is in the unloaded state. During the standard purge cycle or the enhanced purge cycle, the air dryer 20 no longer transmits air via line 22 to the service reservoir 24. Rather, when the control signal is received at control input 21, a path to atmosphere is opened, causing a drop in pressure at the air dryer 20. The air from the purge reservoir 42 begins to flow in a reverse direction through the air dryer 20 through the orifice portion of valve 44. The rate of flow of pressurized air through the air dryer 20 is controlled at least partially by the size of the orifice. Air flows from the purge reservoir 42 through the air dryer 20 collecting water vapor and contaminants to expel to atmosphere until the air volume of the purge reservoir 42 is completely depleted, as in a standard purge cycle, or until the pneumatic control signal from the electropneumatic device 34 is terminated, as in an enhanced purge cycle. The service reservoir 24 is not depleted during a standard purge cycle or an enhanced purge cycle because the check valve 23 only allows air to flow into the service reservoir 24 from the air dryer 20.

The control logic 38 is capable of initiating the standard purge cycle or the enhanced purge cycle based on the signal indicative of the pressure of compressed air in the service reservoir 24 or the regeneration volume value. In a standard purge cycle, the air flow from the purge reservoir 42 continues through the air dryer 20 until the air volume of the purge reservoir 42 is depleted or substantially depleted. In an enhanced purge cycle, the control logic 38 is capable of varying the duration and frequency of the control signal to the electropneumatic valve 34 so that the air volume of the purge reservoir 42 is only partially depleted during the enhanced purge cycle. For example, an enhanced purge cycle depletes up to about 60% of the volume capacity of the purge reservoir 42. In another embodiment, the enhanced purge cycle depletes from about 10% to about 40% of the volume capacity of the purge reservoir 42.

Accordingly, a controller for an air dryer is disclosed. The controller includes a control output for transmitting a control signal to activate an electropneumatic device and control logic capable of initiating an enhanced purge cycle. The control logic is capable of determining a regeneration volume value based on the accumulated volume of air delivered to the associated air dryer and transmits a control signal to the control output for initiating an enhanced purge cycle or a standard purge cycle. In another embodiment, the control logic is capable of determining the accumulated volume of air delivered to the associated air dryer and determining the regeneration volume value based on the accumulated volume.

In another embodiment, the controller includes a pressure input for receiving a pressure signal indicative of the pressure of compressed air in a service reservoir. The control logic initiates an enhanced purge cycle based on the signal indicative of the pressure of compressed air in the service reservoir being greater than an enhanced purge threshold and less than a standard purge pressure threshold and the regeneration volume value being greater than a first predetermined pressure. The control logic initiates a standard purge cycle in response to the signal indicative of pressure of compressed air in the service reservoir being greater than a standard purge pressure threshold and the regeneration volume value being less than or equal to the first predetermined volume threshold.

In another embodiment, the controller includes a control output for both initiating an enhanced purge cycle or a standard purge cycle of an air dryer and setting a compressor in an unloaded state.

Figure 2:
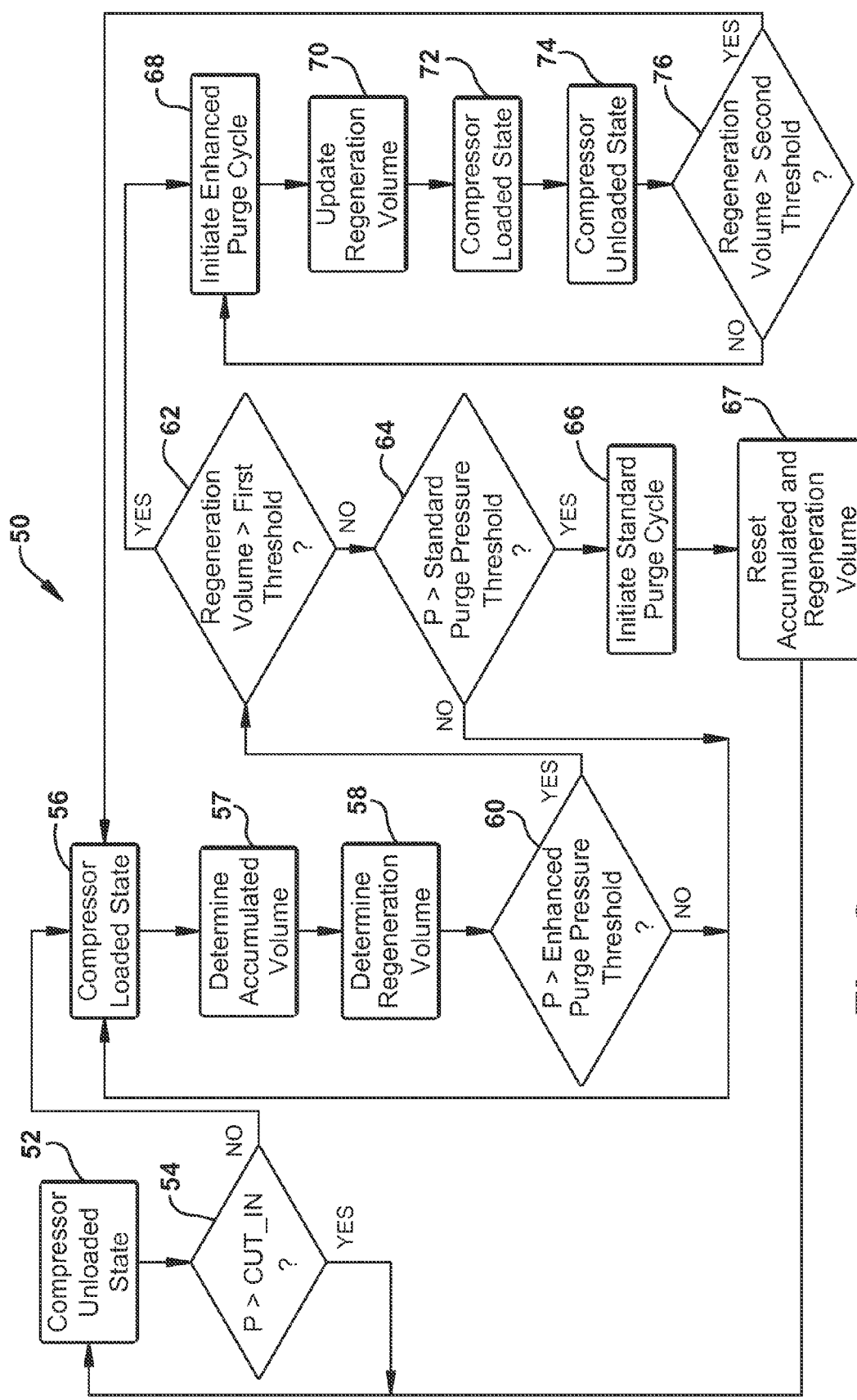
FIG. 2 illustrates a method of implementing the system, according to an embodiment of the present invention.

A flowchart for implementing a method 50 of initiating a standard purge cycle or an enhanced purge cycle of an air dryer according to an embodiment of the invention is shown in FIG. 2. As illustrated, the blocks represent functions, actions and/or events performed therein. It will be appreciated that electronic and software systems involve dynamic and flexible processes such that the illustrated blocks and described sequences can be performed in different sequences.

It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

In step 52, the compressor 12 is in an unloaded state, or not compressing air. The pressure in the service reservoir 24 is measured in step 54 using the pressure sensor 32 or other means. The pressure signal is received by the controller 30 and compared to a predetermined cut in pressure. If the pressure in the service reservoir 24 is greater than a predetermined cut in pressure, the method 50 returns to step 52 and the compressor 12 continues in the unloaded state. Utile pressure in the service reservoir 24 is less than the predetermined cut in pressure, the method enters step 56 and the compressor 12 is set by the controller 30 into a loaded state to increase the pressure in the service reservoir 24.

In step 57, the control logic 38 determines the volume of air delivered to the air dryer 20 by the compressor 12, or the accumulated volume. The accumulated volume is determined using the time the compressor 12 is in the loaded state since any prior standard purge cycle and the compressor 12 output capability. The output capability of the compressor 12 may already be programmed into the control logic 38. For an engine driven compressor, the actual output is dependent on the engine rotations per minute (rpm). For example, a compressor with an output capability of compressing air at 15 Liters per second at 1200 rpm would compress 900 Liters of air in one minute as long as the engine was running at the same speed for the entire minute. It is assumed that the entire volume of air compressed by the compressor 12 is delivered to the air dryer 20. Therefore, by knowing the output capability of the compressor, the engine speed and the time the compressor 12 is in the loaded state since a prior standard purge cycle, the control logic 38 is capable of determining the accumulated volume of air delivered to the air dryer 20. The accumulated volume is set to zero when the controller 30 is installed on the vehicle and after each standard purge cycle. Alternatively, the accumulated volume may be received via the serial communications bus 28 as determined by another controller on the vehicle.

In step 58, the control logic 38 determines a value representative of a regeneration volume. The regeneration volume value represents a volume of air estimated to be required to purge the air dryer 20 and substantially remove the moisture and contaminants from the desiccant 25. The regeneration volume value is a percentage of the accumulated volume of air delivered to the air dryer 20 as determined in step 57. In one embodiment, the regeneration volume value ranges from about 10% to about 15% of the accumulated volume of air delivered to the air dryer 20. In another embodiment, the regeneration volume value is about 12% of the accumulated volume. Therefore, if the volume of air delivered to the air dryer 20 is determined to be 50 L, the regeneration volume value would be 6 L. The regeneration volume value will change as the accumulated volume changes.

In step 60, the method 50 optionally includes comparing the pressure signal indicative of the pressure in the service reservoir 24 to an enhanced purge pressure threshold. If the pressure signal is greater than the enhanced purge pressure threshold, the method moves to step 62. If the pressure signal is less than the enhanced purge pressure threshold, the method 50 returns to step 56 so that the compressor 12 continues in its loaded state. The enhanced purge pressure threshold ranges from about 110 psi to about 120 psi. In another embodiment, the enhanced purge pressure threshold is about 115 psi. The enhanced purge pressure threshold is greater than the cut in pressure and less than a standard purge pressure threshold. The enhanced purge pressure threshold may be predetermined and set in the memory of the control logic 38.

In step 62, the regeneration volume value as determined in step 58 is compared to a first predetermined volume threshold. In one embodiment, the first predetermined volume threshold ranges from about four liters (4 L) to about six liters (6 L). The first predetermined volume threshold is a function of the volume of the purge reservoir 42. In one example, the first predetermined volume threshold is set to be greater than a volume of air in the purge reservoir 42. The volume of air that is used in a standard purge cycle is limited by the capacity of the purge reservoir 42. If the regeneration volume value is less than or equal to the first predetermined volume threshold, the method 50 continues to step 64.

In step 64, the pressure signal is optionally measured again. If the pressure signal is greater than a standard purge pressure threshold, the compressor 12 is unloaded and a standard purge cycle is initiated in step 66. The standard purge pressure threshold ranges from about 110 psi to about 150 psi. In one embodiment, the standard purge pressure threshold is about 130 psi. In another embodiment, the standard purge pressure threshold is the same as the cut out pressure. The standard purge cycle is initiated as the compressor 12 is unloaded. A standard purge cycle will entirely deplete the air volume of the purge reservoir 42. Since the regeneration volume value was less than or equal to the first predetermined volume threshold, the volume of air used in the standard purge cycle is assumed to have substantially removed the moisture in the desiccant 25 of the air dryer 20.

In step 67, the accumulated volume value and regeneration volume value are set to zero. The method 50 returns to step 52 with the compressor in an unloaded state.

If the regeneration volume value is greater than the first predetermined volume threshold in step 62, the compressor 12 is in an unloaded state and an enhanced purge cycle is initiated in step 68. Since the regeneration volume value was greater than the first predetermined volume threshold, it is assumed that the air dryer 20 has delivered a large volume air and the desiccant 25 may contain a larger than a normal amount of moisture. The air dryer 20 needs more air in an enhanced purge cycle than what the purge reservoir 42 operated during a standard purge cycle can provide in order to substantially remove the moisture in the desiccant 25 of the air dryer 20. Initiating an enhanced purge cycle includes activating the electropneumatic device 34. In the enhanced purge cycle, the enhanced purge cycle is precisely controlled via the electropneumatic device 34 so as to partially deplete the air volume of the purge reservoir 42. This means that the duration of the control signal to the electropneumatic device 34 for an enhanced purge cycle will be less than the duration of a control signal for initiating a standard purge cycle. The enhanced purge cycle may be controlled by activating the electropneumatic device 34 for a predetermined time period. In one embodiment, the predetermined time period is between about four seconds and about ten seconds. In another embodiment, the predetermined time period is about six seconds. Therefore the method 50 only allows a portion of the air from the purge reservoir 42 at the highest pressure to pass back through the air dryer 20 during an enhanced purge cycle. In one embodiment, the predetermined time period is based on the amount of time to reduce the volume of the purge reservoir 42 from about 4.5 L to about 3 L. Therefore, the method 50 allows between 10% and 40% of the volume of the air in the purge reservoir 42 to be used in one enhanced purge cycle. In the enhanced purge cycle, for example, up to about 60% of the volume capacity of the purge reservoir 42 is depleted. In another embodiment, the enhanced purge cycle depletes from about 10% to about 40% of the volume capacity of the purge reservoir 42.

In step 70, the regeneration volume value is updated. Updating the regeneration volume value means that the value is decremented by a value equivalent to the amount of air used in the first enhanced purge cycle. For example, if the first enhanced purge cycle used about 0.5 L of air from the purge reservoir 42 then the regeneration volume value would be decremented by an amount of 0.5 L.

In step 72, the compressor 12 is set in the loaded state by the controller 30 long enough to refill the purge reservoir 42 to approximately the cut out pressure. In one embodiment, the pressure in the purge reservoir 42 will be greater than the cut out pressure. In this instance, a standard purge cycle will not be initiated because the enhanced purge cycles have already begun. The compressor is then set in the unloaded state in step 74.

In step 76, the regeneration volume value is compared to a second predetermined volume threshold. The second predetermined volume threshold is set lower than the first predetermined volume threshold. For example, the second predetermined volume threshold ranges from about 3 L to about 5 L. The first predetermined volume threshold is set at low enough level so that the interruption of a charging cycle does not occur unless the moisture assumed to be in the desiccant 25 is such that the air dryer 20 may be unable to substantially dry the air. The second predetermined volume threshold is set lower than the first predetermined volume threshold to since each enhanced purge cycle will reduce the regeneration volume value. If the regeneration volume value is greater than or equal to the second predetermined volume value, the method 50 returns to step 68 and another enhanced purge cycle will be initiated. Since the purge reservoir 42 was refilled in step 72, the second enhanced purge cycle will begin with the purge reservoir 42 at the higher pressure, about 130 psi, rather than the pressure the purge reservoir 42 was after the first enhanced purge cycle. Therefore, a subsequent enhanced purge cycle is made using the higher purge reservoir 42 pressure. Steps 68 through 76 repeat while the regeneration volume value is greater than or equal to the second predetermined volume threshold.

In one example embodiment it is desired that about 12% of the total volume of air dried by the air dryer 20 is used to purge the air dryer 20 in order to achieve a regeneration volume value less than the second predetermined volume threshold. Therefore, it may be necessary to perform more than one enhanced purge cycle to achieve usage of 12% of the total air treated. For example, a first predetermined threshold could be set at 6 L and the second predetermined threshold could be set at 4 L. If the accumulated volume of air processed by the air dryer is 60 L, then the regeneration volume value would be 7.2 L. If the amount of air used in the first enhanced purge cycle from the purge reservoir 42 is 0.5 L, the regeneration volume value would only be decremented by 0.5 L and stilt be above the second predetermined volume threshold.

An enhanced purge cycle will permit only a portion of the pressure in the service reservoir to be used during an enhanced purge cycle by shortening the amount of time the purge air is allowed to pass back through the air dryer. These enhanced purge cycles may be made with a purge reservoir 42 pressure higher than a cut out pressure. Additional enhanced purge cycles will be performed until the regeneration volume value is less than the second predetermined threshold. When the regeneration volume value is less than the second predetermined volume threshold, the method 50 returns to step 56 so as to build pressure to the standard purge pressure threshold.

Accordingly, in one embodiment, a method for controlling an air dryer is disclosed. The method includes controlling an enhanced purge cycle of the air dryer by receiving or determining an accumulated volume of air, determining a regeneration volume value, and transmitting a control signal to initiate an enhanced purge cycle. In one embodiment, an enhanced purge cycle is initiated in response to the pressure in the service reservoir being greater than an enhanced purge pressure threshold and the regeneration volume value being greater than a first predetermined volume threshold. For example, the pressure in the service reservoir is about 120 psi. The regeneration volume value is determined to be 8 L based on 80 L of air being delivered to the air dryer since a prior standard purge cycle. If the first predetermined threshold was set at 6 L and the second predetermined threshold was set at 4 L, the controller, as embodied using this example method, would transmit the shorter duration control signal so that the air volume of the purge reservoir would only be partially depleted. In this example, if only 0.5 L of air was used from the purge reservoir, the regeneration volume value would be decremented and remain at 7.5 L, still above the second predetermined volume threshold. The controller would then initiate a second and subsequent enhanced purge cycles until the regeneration volume value was below the second predetermined volume threshold. The regeneration volume value is not set to zero after any of the enhanced purge cycles.

Figure 3:
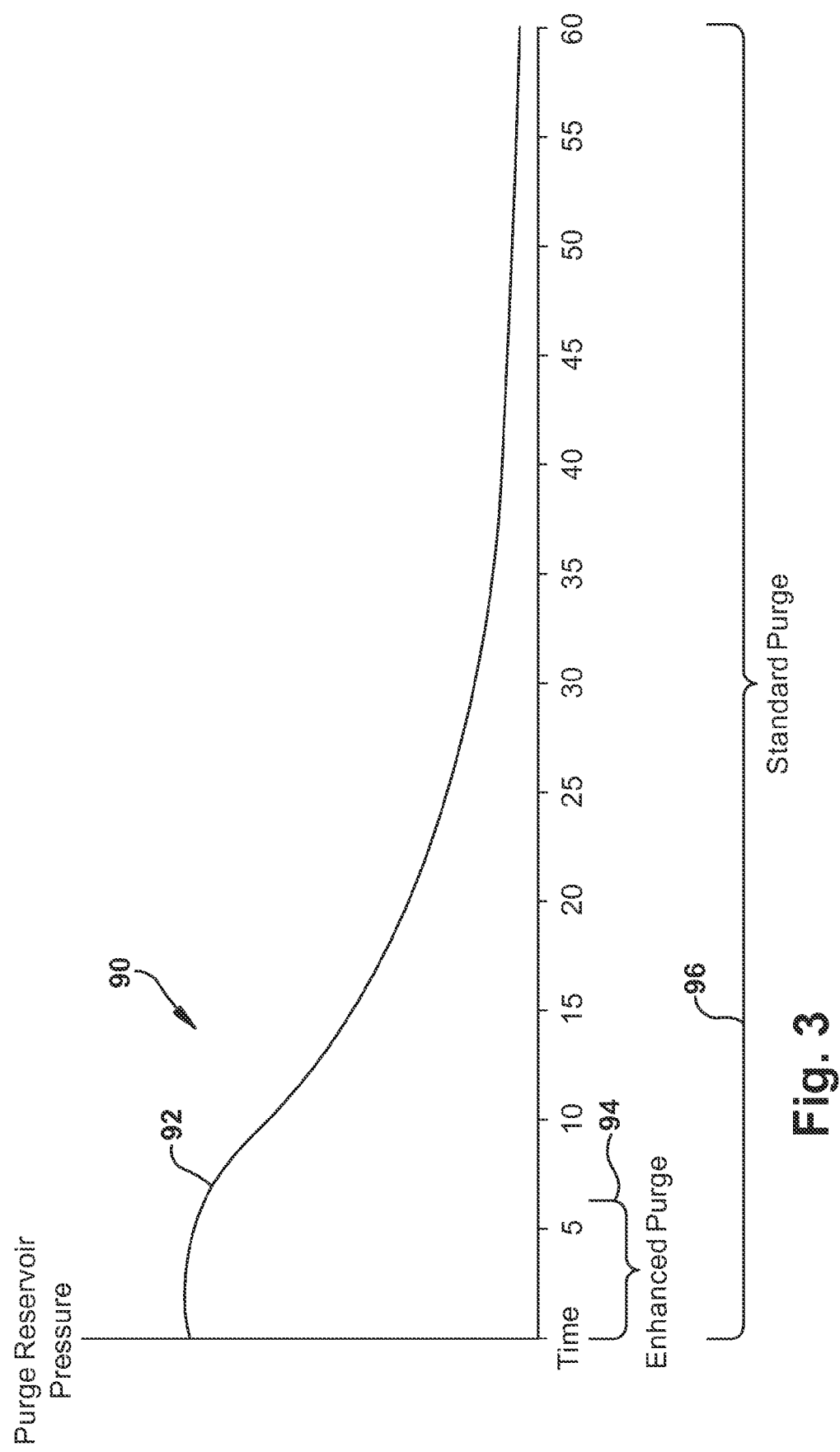
FIG. 3 illustrates a graph of air pressure in a purge reservoir over time, according to an embodiment of the present invention.

In FIG. 3, graph 90 illustrates a line 92 representing a rate of air flow through the air dryer 20 according to an example embodiment of the present invention. The flow rate is affected in part by the size of the orifice portion of the valve 44. An enhanced purge cycle 94 of about six seconds is shown. The short six second enhanced purge cycle 94 allows the higher pressurized air to flow through the air dryer 20 to regenerate the desiccant 25. The standard purge cycle 96 exhausts all of the air from the purge reservoir 42 through the air dryer 20 in a standard purge cycle duration of about sixty seconds. The higher pressure, shorter bursts of air used in the enhanced purge cycle 94 are more effective at removing the moisture from the desiccant 25 at least in part because air at high velocity enhances the ability of the desiccant 25 to transfer moisture. In addition, it has been noted that the performance of the system with the enhanced purge cycles allows a smaller purge reservoir to be used since the system purges as often as necessary to reduce the moisture based on the accumulated volume and regeneration volume value.

In another embodiment, the compressor 12 may be loaded to allow the pressure in the purge reservoir 42 to be greater than the cut out pressure established for the service reservoir 24. This feature allows even greater pressure air to be used in the enhanced purge cycle for more effective drying of the desiccant 25 due to the greater mass of available air to be used in the enhanced purge cycle.

Accordingly, a controller for an air dryer includes an output for a control signal for initiating an enhanced purge cycle or a standard purge cycle. The control logic terminates the control signal when a partial air volume of an associated purge reservoir is depleted. In one example, the control logic terminates the control signal when the partial air volume depletion ranges from about 10% to about 40% of the volume capacity of the associated purge reservoir. Alternatively, the control logic is capable of transmitting the control signal to the control output for a duration of time based on the time it takes to deplete a partial air volume of an associated purge reservoir. In one example, the duration of time ranges from about four seconds to about ten seconds.

In FIG. 4, a graph 100 depicting the operation of the air charging system 10 according to an example embodiment of the present invention is shown. The upper portion of graph 100 shows the variations in the pressure signal 103 indicative of pressure in the service reservoir 24. The lower portion of graph 100 shows variations in the regeneration volume value 101 as the pressure in the service reservoir 24 changes and either standard purge cycles or enhanced purge cycles are performed.

In section 102, the compressor 12 is in the loaded state and pressure in the service reservoir 24 is building toward the standard purge pressure threshold 124. The regeneration volume value 101 begins to rise from zero as the accumulated volume of air delivered to the air dryer 20 increases. The regeneration volume value 101 did not exceed the first predetermined volume threshold 132 even though the pressure signal 103 was greater than the enhanced purge pressure threshold 128. A standard purge cycle is performed at the end of section 102 when the service reservoir 24 reaches the standard purge pressure threshold 124 and the compressor 12 is set in the unloaded state. The accumulated volume and regeneration volume value 101 are set back to zero at the end of the standard purge cycle.

In section 104, the pressure in the service reservoir 24 is being reduced due to usage of the air in vehicle systems. Once the pressure signal 103 is less than or equal to the cut in pressure threshold 126, the compressor 12 is set to the loaded state.

In section 106, the compressor 12 is in the loaded state and the accumulated volume increases. Therefore, the regeneration volume value 101 also increases. Here, the regeneration volume value 101 increases above the first predetermined volume threshold 132. Since the pressure signal 103 is above the enhanced purge pressure threshold 128, an enhanced purge cycle is initiated. The enhanced purge cycle occurs in section 108. One enhanced purge cycle is enough to reduce the regeneration volume value 101 below the second predetermined volume threshold 130. The regeneration volume value 101 is not reset to zero after an enhanced purge cycle. The regeneration volume value 101 is only reset to zero following a subsequent standard purge cycle.

In section 110, the compressor 12 continues in its loaded state until the pressure signal 103 is greater than the standard purge pressure threshold 124. The compressor 12 is then set to the unloaded state. A standard purge cycle is initiated at the end of section 110. The accumulated volume and regeneration volume value 101 are set to zero.

In section 112, the compressor 12 remains in the unloaded state as the pressure signal 103 in the service reservoir as long as the pressure signal 103 remains above the cut in pressure threshold 126. When the pressure signal 103 decreases below the cut in pressure threshold 126, the compressor 12 is again returned to the loaded state in section 114. The regeneration volume value 101 increases as well since the value is a percentage of the accumulated volume delivered to the air dryer 20.

In section 116, an enhanced purge cycle is initiated because the regeneration volume value 101 is above the first predetermined volume threshold 132 and the pressure signal 103 is above the enhanced purge pressure threshold 128. The regeneration volume value 101 is decremented in proportion to the volume of air used in the first enhanced purge cycle. For example, if the first enhanced purge cycle used about 0.5 L of air from the purge reservoir 42 then the regeneration volume value would be decremented by an amount of 0.5 L. The pressure signal 103 increases at the same time the compressor 12 is loaded at the end of section 116 in order to simultaneously increase the pressure in the purge reservoir 42. Since the regeneration volume value 101 is still above the second predetermined volume threshold 130, a second enhanced purge cycle is initiated in section 120.

At the end of section 120, the regeneration volume value 101 is less than the second predetermined volume threshold 130 so no further enhanced purge cycles are run. The compressor 12 continues in the loaded state throughout section 122. At the end of section 122, the compressor 12 is unloaded, a standard purge cycle is initiated and the regeneration volume value 101 is set back to zero.

Accordingly, a controller capable of initiating a first enhanced purge cycle is also capable of initiating a second enhanced purge cycle in response to the pressure of compressed air in the associated service reservoir being greater than the enhanced purge pressure threshold and the regeneration volume value being greater than a second predetermined volume threshold. The first predetermined volume threshold is greater than the second predetermined volume threshold.

While the present invention has been illustrated by the description of embodiments described above, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept.

We claim:

1. A controller for a vehicle air dryer comprising:
   a control output for transmitting a control signal for controlling an associated air dryer; and
   control logic capable of initiating an enhanced purge cycle of the associated air dryer, wherein the control logic determines a regeneration volume value based on an accumulated volume of air delivered to the associated air dryer and transmits a control signal to the control output for initiating the enhanced purge cycle when the regeneration volume value exceeds a first predetermined volume threshold, wherein the duration of time of the enhanced purge cycle is based on a time to deplete a partial volume of an associated purge reservoir.

2. The controller as in claim 1, wherein the control logic terminates the control signal when a partial air volume of an associated purge reservoir is depleted.

3. The controller as in claim 2, wherein the partial air volume depleted ranges from about 10% to about 40% of the volume capacity of the associated purge reservoir.

4. The controller as in claim 1, wherein the duration of time ranges from about four seconds to about ten seconds.

5. The controller as in claim 1, wherein the control logic is capable of initiating a second enhanced purge cycle.

6. The controller as in claim 5, wherein the control logic initiates the second enhanced purge cycle in response to the regeneration volume value being greater than a second predetermined volume threshold.

7. The controller as in claim 6, wherein the first predetermined volume threshold is greater than the second predetermined volume threshold.

8. The controller as in claim 1, wherein the accumulated volume is a volume of compressed air delivered to the air dryer since at least one of an installation of the controller and a prior standard purge cycle.

9. The controller as in claim 1, further comprising:
   a pressure input for receiving a pressure signal indicative of the pressure of compressed air in an associated service reservoir; wherein the control logic transmits the control signal for initiating the enhanced purge cycle when the pressure signal is greater than an enhanced purge pressure threshold and is less than a standard purge pressure threshold.

10. The controller as in claim 9, wherein the control logic is capable of initiating a standard purge cycle in response to the pressure signal being greater than the standard purge pressure threshold and the regeneration volume value being less than or equal to the first predetermined volume threshold.

11. The controller as in claim 10, wherein the control logic determines the accumulated volume as a volume of compressed air delivered to the associated air dryer since the initiation of the standard purge cycle.

12. The controller as in claim 11, wherein the accumulated volume is set to zero after the completion of the standard purge cycle.

13. The controller as in claim 1, wherein the regeneration volume value is a percentage of the accumulated volume of air.

14. The controller as in claim 13, wherein the regeneration volume value ranges from about 10% to about 15% of the accumulated volume of air.

15. The controller as in claim 1, wherein the first predetermined volume threshold is a function of a volume capacity of an associated purge reservoir.

16. The controller as in claim 1, further comprising:
   a serial communications bus port, wherein the accumulated volume is a signal received via the serial communications bus port.

17. The controller as in claim 1, wherein the control logic sets an associated compressor in an unloaded state when the control logic transmits the control signal for initiating an enhanced purge cycle.

18. A controller for an air dryer comprising:
   a pressure input for receiving a pressure signal indicative of the pressure of compressed air in an associated service reservoir;
   a volume input for receiving a signal indicative of an accumulated volume of air delivered to the air dryer since a standard purge cycle;
   a control output for transmitting a control signal to an electropneumatic device; and
   control logic capable of initiating an enhanced purge cycle of an associated air dryer, wherein the control logic:
      determines a regeneration volume value based on the accumulated volume signal;
      transmits a control signal to the control output for initiating the enhanced purge cycle, the enhanced purge cycle depleting a portion of the purge reservoir when the regeneration volume value exceeds a first predetermined volume threshold and the pressure signal is greater than an enhanced purge pressure threshold.

19. The controller as in claim 18, wherein the portion of the air volume of the purge reservoir depleted ranges from about 10% to about 40% of the volume capacity of the purge reservoir.

20. The controller as in claim 18, wherein the first predetermined volume threshold is a function of the volume of the purge reservoir.

21. A method for controlling an air dryer comprising:
   determining a regeneration volume value based on an accumulated volume of air delivered to an air dryer;
   transmitting a control signal to initiate an enhanced purge cycle of the air dryer in response to the regeneration volume value being greater than a first predetermined volume threshold;
   receiving a pressure signal indicative of a pressure in a service reservoir;
   transmitting the control signal to initiate the enhanced purge cycle in response to the pressure in the service reservoir being greater than an enhanced purge pressure threshold and less than a standard purge pressure threshold; and
   initiating the enhanced purge cycle in response to the pressure signal and the control signal.

22. The method as in claim 21, wherein the enhanced purge pressure threshold is less than a standard purge pressure threshold.

23. The method as in claim 21, wherein transmitting the control signal comprises activating an electropneumatic device for a predetermined time period.

24. The method as in claim 23, wherein the predetermined time period is based on the amount of time to reduce a predetermined volume of air in a purge reservoir and wherein the predetermined volume of air ranges from about 10% to about 40% of the volume capacity of the purge reservoir.

25. The method as in claim 21, further comprising:
   transmitting a control signal to initiate a second enhanced purge cycle in response to the regeneration volume value being greater than a second predetermined volume threshold.

26. The method as in claim 25, wherein the second predetermined volume threshold is less than the first predetermined volume threshold.

27. The method as in claim 21, further comprising:
   transmitting a control signal to initiate a standard purge cycle in response to the pressure in the service reservoir being greater than a standard purge pressure threshold and the regeneration volume value being less than or equal to the first predetermined volume threshold.

28. A method for controlling an air dryer comprising:
   determining an accumulated volume of air provided to an air dryer since a standard purge cycle;
   determining a regeneration volume value, wherein the regeneration volume value is based on the accumulated volume of air;
   determining a pressure in a service reservoir downstream of the air dryer;
   initiating an enhanced purge cycle of the air dryer in response to the pressure in the service reservoir being greater than a pressure threshold and the regeneration volume value being greater than a first predetermined volume threshold; and
   partially depleting the air volume in a purge reservoir during the enhanced purge cycle.

29. The method as in claim 28, wherein the partial depletion of the air volume in the purge reservoir ranges from about 10% to about 40% of the volume capacity of the purge reservoir.

30. The method as in claim 28, further comprising:
   decrementing the regeneration volume value based on the volume of air depleted from the purge reservoir.

31. The method as in claim 28 further comprising:
   providing compressed air to the purge reservoir after the enhanced purge cycle terminates to increase the pressure in the purge reservoir above a cut out pressure.

32. The method as in claim 28, further comprising:
   comparing the regeneration volume value to a second predetermined volume threshold; and
   initiating a second enhanced purge cycle, wherein the regeneration volume value is greater than the second predetermined volume threshold.

\* \* \* \* \*